United States Patent
Yamada et al.

(10) Patent No.: US 10,638,360 B2
(45) Date of Patent: Apr. 28, 2020

(54) COMMUNICATION PROCESSING SYSTEM AND GROUP MESSAGE PROCESSING METHOD

(71) Applicant: NEC CORPORATION, Tokyo (JP)

(72) Inventors: Toru Yamada, Tokyo (JP); Kyoji Hirata, Tokyo (JP); Akira Kamei, Tokyo (JP); Hotaka Sugano, Tokyo (JP); Masahiro Serizawa, Tokyo (JP); Satoshi Hasegawa, Tokyo (JP); Masashi Shimoma, Tokyo (JP); Yumiko Okuyama, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 35 days.

(21) Appl. No.: 15/762,325

(22) PCT Filed: Aug. 26, 2016

(86) PCT No.: PCT/JP2016/075073
§ 371 (c)(1),
(2) Date: Mar. 22, 2018

(87) PCT Pub. No.: WO2017/051664
PCT Pub. Date: Mar. 30, 2017

(65) Prior Publication Data
US 2018/0279166 A1 Sep. 27, 2018

(30) Foreign Application Priority Data
Sep. 24, 2015 (JP) .................................. 2015-186303

(51) Int. Cl.
*H04W 28/04* (2009.01)
*H04W 4/06* (2009.01)
(Continued)

(52) U.S. Cl.
CPC ........... *H04W 28/04* (2013.01); *H04L 1/1829* (2013.01); *H04W 4/06* (2013.01); *H04W 4/08* (2013.01);
(Continued)

(58) Field of Classification Search
CPC ......... H04W 28/04; H04W 4/06; H04W 4/08; H04W 4/70; H04W 28/0215; H04L 1/1829
See application file for complete search history.

(56) References Cited

U.S. PATENT DOCUMENTS

| 2007/0076739 A1* | 4/2007 | Manjeshwar | ....... H04L 12/1868 370/432 |
| 2008/0062936 A1* | 3/2008 | He | ..................... H04W 72/12 370/338 |

(Continued)

OTHER PUBLICATIONS

3GPP TR 23.888 V11.0.0, 3rd Generation Partnership Project; Technical Specification Group Services and System Aspects; System improvements for Machine-Type Communications, (MTC), (Release 11), Sep. 2012, pp. 1-165.

(Continued)

*Primary Examiner* — Ajay Cattungal
(74) *Attorney, Agent, or Firm* — Sughrue Mion, PLLC

(57) ABSTRACT

A system of this invention is directed to a communication processing system that copes with a failure while avoiding network congestion or overload by reducing signaling even if a device cannot receive a group message. This communication processing system forms VPLMN (Visited Public Land Mobile Network), and includes a group messaging request acquirer that acquires, from an application, a group messaging request to be distributed to a plurality of devices, a group messaging request distributer that distributes the group messaging request to the plurality of devices, and a redistribution instructor that instructs, when receiving no
(Continued)

response to the group messaging request from any one device in the plurality of devices within a predetermined time, the group messaging request distributer to redistribute the group messaging request to a service area including the any one device based on error information of the service area.

9 Claims, 21 Drawing Sheets

(51) Int. Cl.
H04W 4/08 (2009.01)
H04L 1/18 (2006.01)
H04W 4/70 (2018.01)
H04W 28/02 (2009.01)

(52) U.S. Cl.
CPC ......... H04W 4/70 (2018.02); H04W 28/0215 (2013.01)

(56) References Cited

U.S. PATENT DOCUMENTS

| | | | | |
|---|---|---|---|---|
| 2010/0142452 A1* | 6/2010 | Mariniello | ........... | H04Q 3/0045 370/329 |
| 2012/0113986 A1* | 5/2012 | Shaffer | ................ | H04L 1/1854 370/390 |
| 2014/0112251 A1* | 4/2014 | Kim | ........................ | H04W 4/70 370/328 |
| 2014/0355604 A1* | 12/2014 | Mutschler | ............... | H04L 47/10 370/390 |
| 2015/0109921 A1* | 4/2015 | Zhao | ..................... | H04W 28/06 370/230 |
| 2015/0124681 A1* | 5/2015 | Zhou | ..................... | H04M 3/567 370/312 |
| 2015/0271806 A1* | 9/2015 | Kim | .................... | H04W 72/048 455/452.1 |
| 2016/0135143 A1* | 5/2016 | Won | .................... | H04W 72/005 370/312 |
| 2016/0192403 A1* | 6/2016 | Gupta | .................... | H04L 12/18 455/411 |

OTHER PUBLICATIONS

3GPP TR 23.887 V12.0.0, 3rd Generation Partnership Project; Technical Specification Group Services and System Aspects; Study on Machine-Type Communications (MTC) and other mobile data applications communications enhancements (Release 12), Dec. 2013, pp. 1-151.

Nokia Siemens Networks, Huawei, Hisilicon, Samsung, "MBMS based Group Messaging solutions", 3GPP TSG-SA WG2 Meeting #93, S2-124152, Oct. 8-12, 2012, 7 pages.

International Search Report for PCT/JP2016/075073 dated Nov. 8, 2016 [PCT/ISA/210].

* cited by examiner

Figure 8.1.3.2.1.1-2 : Procedure flows MBMS based group messaging option 1 (3GPP TS 23.887 V12.0.0 (2013.12))

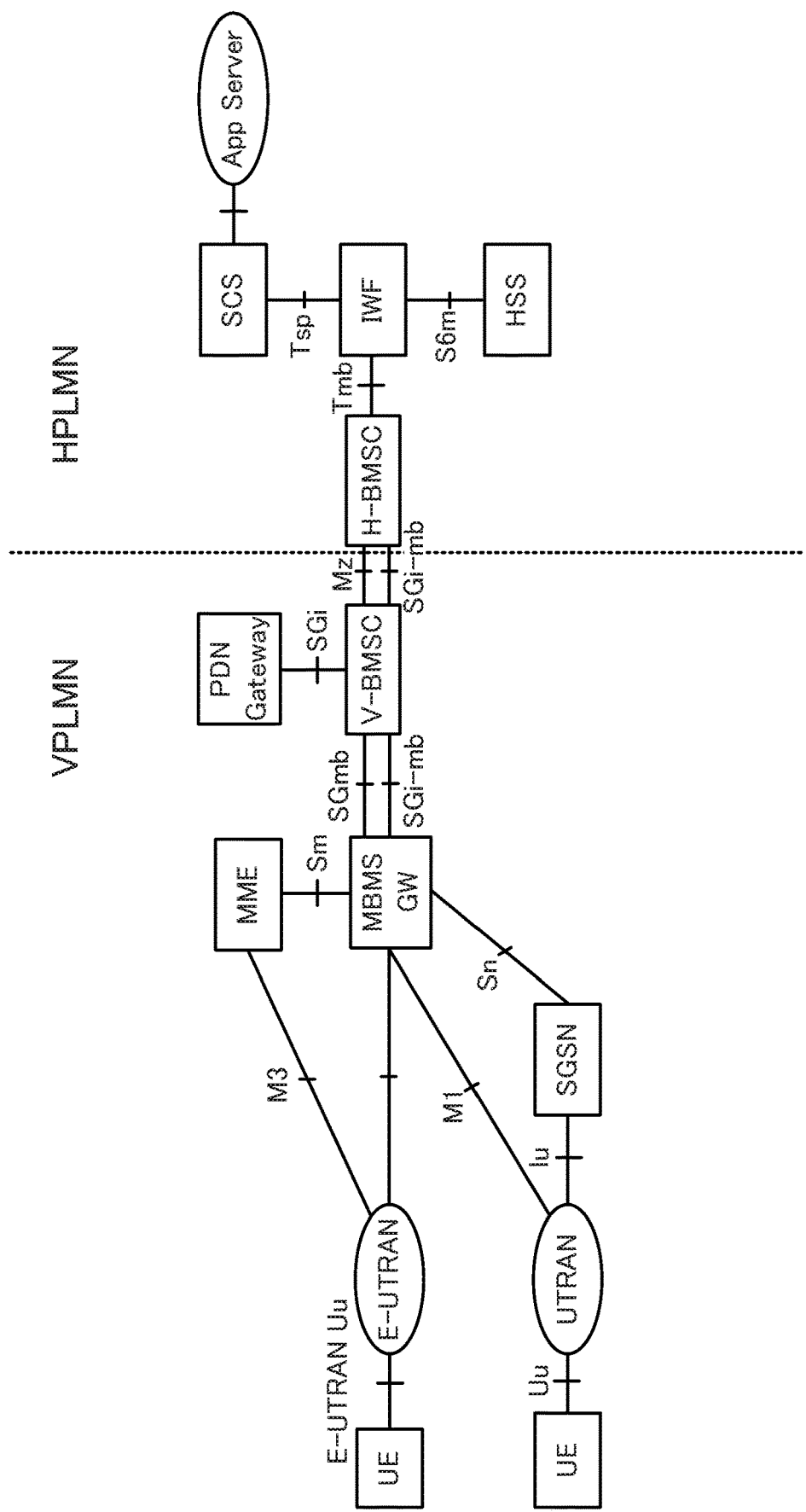
Figure 8.1.3.2.1.1-1 : MBMS based group messaging architecture option 1 (3GPP TS 23.887 V12.0.0 (2013.12))
F I G. 3B Figure 8b : Session Start procedure for E-UTRAN and UTRAN for EPS(3GPP TS.23.246 V13.1.0(2015-06))

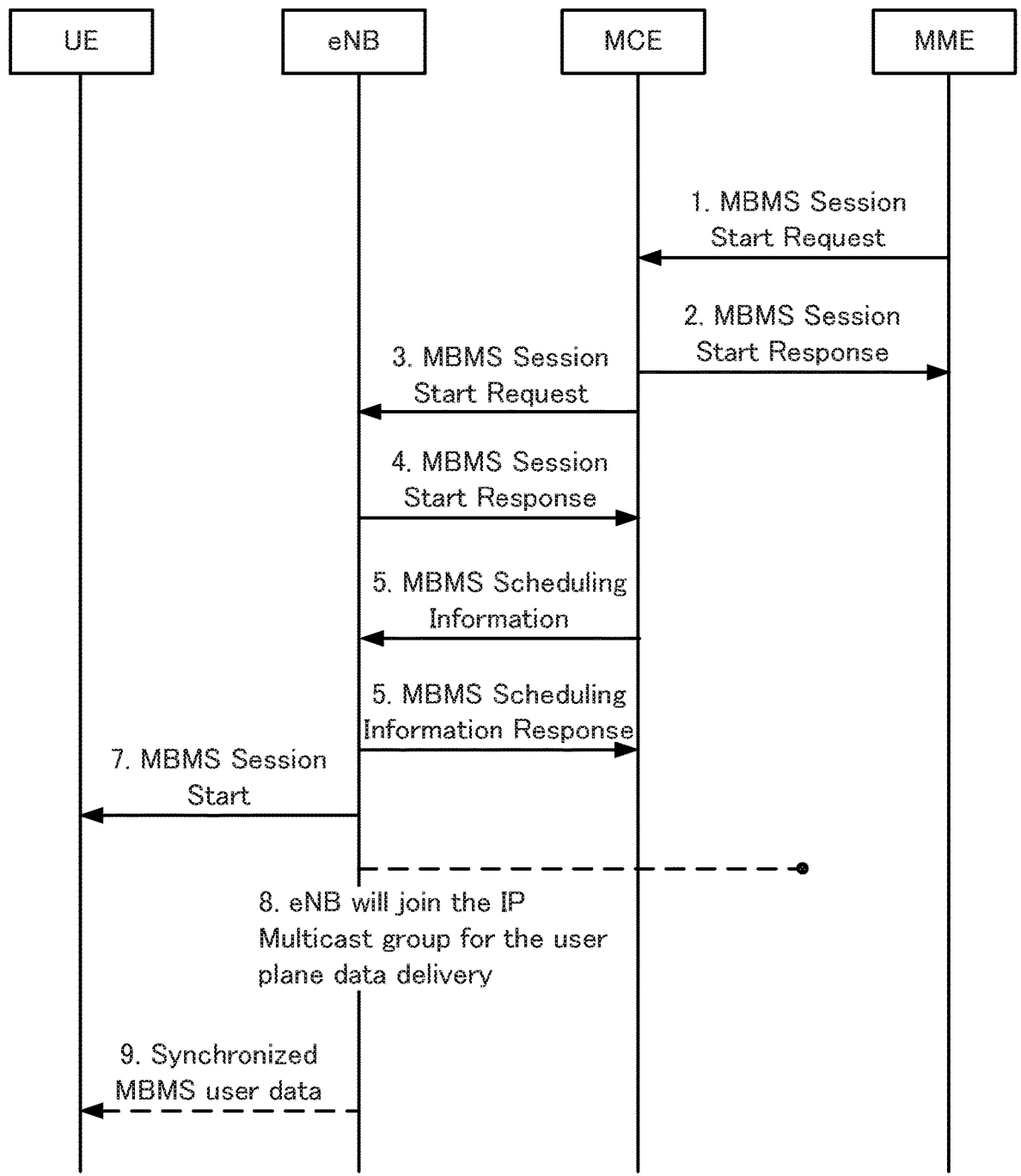
Figure 15.7.1.1-1 : Session Start procedure (3GPP TS 36.300 V12.4.0(2014-12))
Note : When to send the MBMS Session Start message from MCE to eNB according to the minimum time to wait indication in an MCE implementation issue.
F I G. 3D

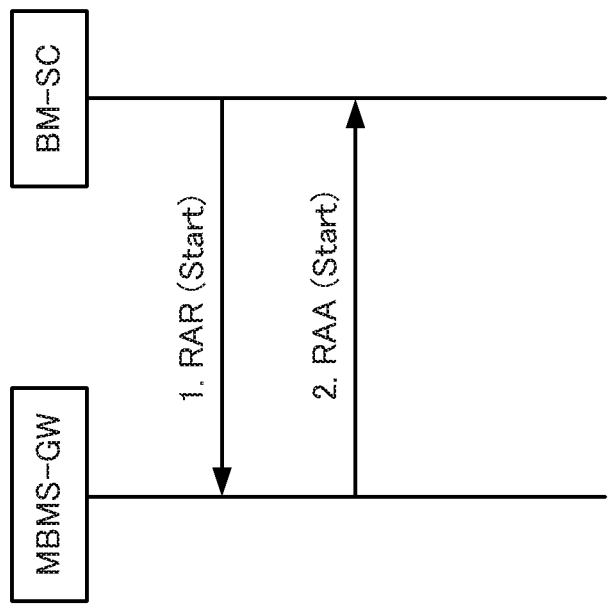
Figure 20.3.1.1 : MBMS Session Start procedure (3GPP TS 29.061 V13.0.0(2015-03))
F I G. 3E

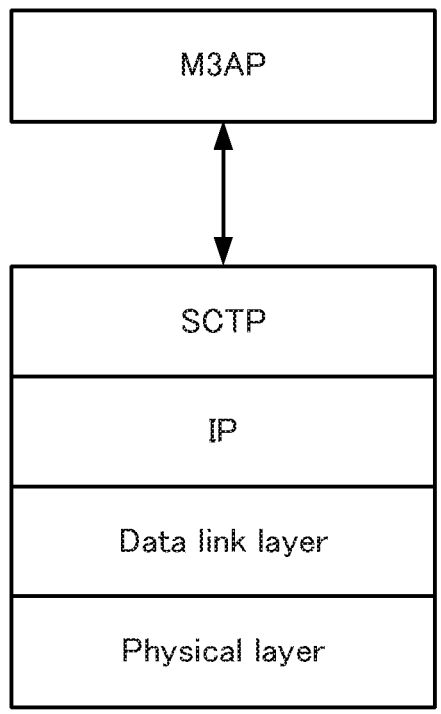
Figure 15.9.1.1-1 : M3 Interface Control Plane (MME-MCE)
(3GPP TS 36.300 V12.4.0(2014-12))
F I G. 5B

9.1.8 ERROR INDICATION

This message is sent by both the MME and the MCE and is used to indicate that some error has been detected in the node Direction : MCE → MME and MME → MCE

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| MME MBMS M3AP ID | O | | 9.2.3.2 | | YES | ignore |
| MCE MBMS M3AP ID | O | | 9.2.3.1 | | YES | ignore |
| Cause | O | | 9.2.1.2 | | YES | ignore |
| Criticality Diagnostics | O | | 9.2.1.7 | | YES | ignore |

531

3GPP TS 36.444 V13.0.0 (2015-06)

FIG. 5C

| Radio Network Layer cause | Meaning |
|---|---|
| Unknown or already allocated MCE MBMS M3AP ID | The action failed because the MCE MBMS M3AP ID is either unknown, or (for a first message received at the MCE) is known and already allocated to an existing MBMS service related context. |
| Unknown or already allocated MME MBMS M3AP ID | The action failed because the MME MBMS M3AP ID is either unknown, or (for a first message received at the MCE) is known and already allocated to an existing context. |
| Unknown or inconsistent pair of MBMS M3AP IDs | The action failed because both MBMS M3AP IDs are unknown, or are known but do not define a singles MBMS context. |
| Radio resources not available | No requested radio resources are available. |
| Invalid QoS combination | The action was failed because of invalid QoS combination. |
| Interaction with other procedure | The action is due to an ongoing interaction with another procedure. |
| Not supported QCI Value | The E-RAB setup failed because the requested QCI is not supported. |
| Unspecified | Sent for NAS cause when none of the specified cause values applies. |

| Transport Layer cause | Meaning |
|---|---|
| Transport Resource Unavailable | The required transport resources are not available. |
| Unspecified | Sent for transport network layer cause when none of the specified cause values applies. |

| NAS cause | Meaning |
|---|---|
| Unspecified | Sent for NAS cause when none of the specified cause values applies. |

| Protocal cause | Meaning |
|---|---|
| Transfer Syntax Error | The received message included a transfer syntax error. |
| Abstrat Syntax Error (Reject) | The received message included a abstract syntax error and the concerning criticality indicated "reject". |
| Abstrat Syntax Error (Ignore And Notify) | The received message included a abstract syntax error and the concerning criticality indicated "ignore and notify". |
| Message Not Compatible With Receiver State | The received message was not compatible with the receiver state. |
| Semantic Error | The received message included a semantic error. |
| Abstrat Syntax Error (Falsely Constructed Message) | The received message contained IEs or IE group in wrong order or with too many occurrences. |
| Unspecified | Sent for protocol cause when none of the specified cause values applies. |

| Miscellaneous cause | Meaning |
|---|---|
| Control Processing Overload | Control processing overload. |
| Not enough User Plane Processing Resources | No requested user plane resources are available. |
| Hardware Failure | Action related to hardware failure. |
| O&M Intervention | The action is due to O&M intervention. |
| Unknown or inconsistent pair of MBMS M3AP IDs | Sent when none of the above cause values applies and the cause is not related to any of the categories Radio Network Layer, Transport Network Layer, NAS or Protocol. |

F I G.   5D

| Message Type | Cause vlaue (decimal) | Meaning |
|---|---|---|
| | 0 | Reserved. Shall not be send and if received the Cause ... |
| Request / Initial message | 1 | Reserved |
| | 2 | Local Detach |
| | ⋮ | ⋮ |
| | ⋮ | ⋮ |
| | ⋮ | ⋮ |
| | ⋮ | ⋮ |
| | ⋮ | ⋮ |
| Acceptance in a Response / triggered message. See Note 1. | 16 | Requested accepted |
| | 17 | Requested accepted partially |
| | 18 | new PDN type due to network preference |
| | ⋮ | ⋮ |
| | ⋮ | ⋮ |
| Rejection in a Response / triggered message. See Note 1. | 64 | Context not Found |
| | 65 | Invaild Message Format |
| | 66 | Version not supported by next peer |
| | ⋮ | ⋮ |
| | ⋮ | ⋮ |
| | ⋮ | ⋮ |
| | ⋮ | ⋮ |
| | ⋮ | ⋮ |
| | ⋮ | ⋮ |
| | ⋮ | ⋮ |
| | ⋮ | ⋮ |
| | ⋮ | ⋮ |
| | ⋮ | ⋮ |
| | ⋮ | ⋮ |
| | 121 to 239 | Spare. For future use in an triggerd/response message. See NOTE 4. |
| Request / Initial message | 240 to 255 | Spare. For future use in an initial/request message. See NOTE 5. |

551

NOTE 1:
NOTE 2:
NOTE 3:
NOTE 4: This value is or may be used in the newer versions of the spec. If the receiver cannot comprehend the value, it shall be interpreted as unspecified rejection cause. unspecified/unrecognized rejection cause shall be treated in the same ways as the cause value 94 "Request rejected (reason not specified)".
NOTE 5:
NOTE 6:
NOTE 7:

F I G.  5E

| Information elements | P | Condition / Comment | IE Type | Ins. |
|---|---|---|---|---|
| Cause | M |  | Cause | 0 |
| Sender F-TEID for Control Plane | M |  | F-TEID | 0 |
| MBMS Distribution Acknowledge | C | This IE shall be included on the Sn Interface. | MBMS Distribution Acknowledge | 0 |
| Sn-U SGSN F-TEID | C | This IE shall be included on the Sn interface if some RNCs have not accepted IP multicast distribution. | F-TEID | 1 |
| Recovery | C | This IE shall be included if contacting the peer for the first time. | Recovery | 0 |
| Private Extension | O |  | Private Extension | VS |

Table 7.13.2-1 : information elements in a MBMS Session Start Response

FIG. 7

9.1.5 MBMS SESSION START FAILURE

This message is sent by the MCE to report the unsuccessful outcome of the request from the MBMS SESSION START message.

Direction: MCE → MME.

| IE/Group Name | Presence | Range | IE Type and reference | Semantics desctiption | Criticality | Asigned Criticality |
|---|---|---|---|---|---|---|
| Message Type | M | | 9.2.1.1 | | YES | rejrct |
| MME MBMS M3AP ID | M | | 9.2.3.2 | | YES | ignore |
| Cause | M | | 9.2.1.2 | | YES | ignore |
| Criticality Diagnostics | O | | 9.2.1.7 | | YES | ignore |

3GPP TS 36.444 V13.0.0 (2015-06)

FIG. 9

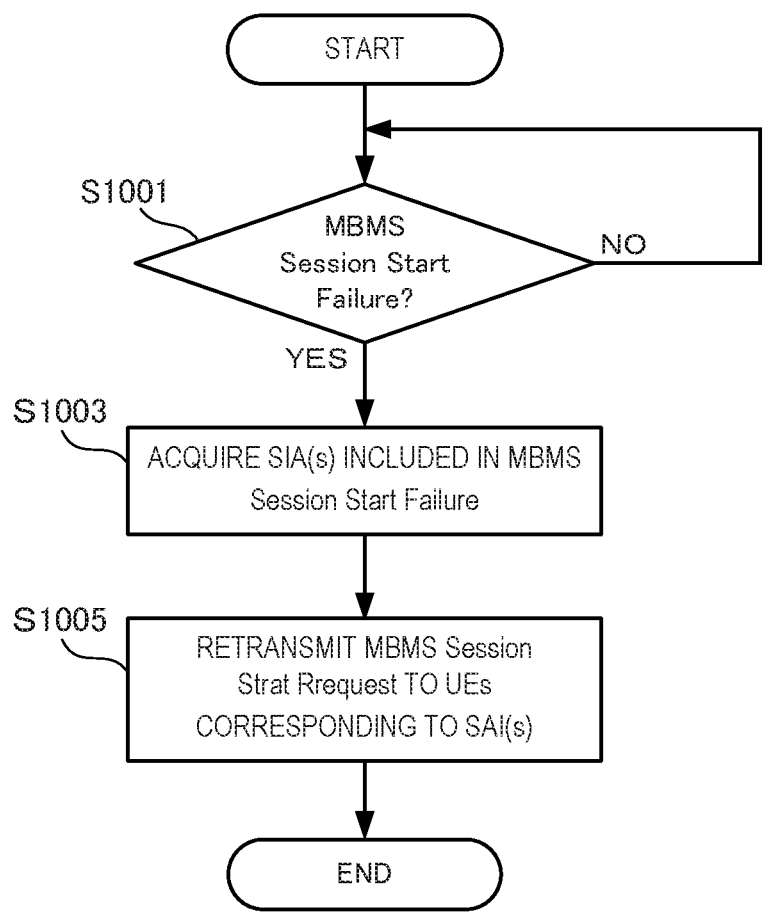
F I G. 10

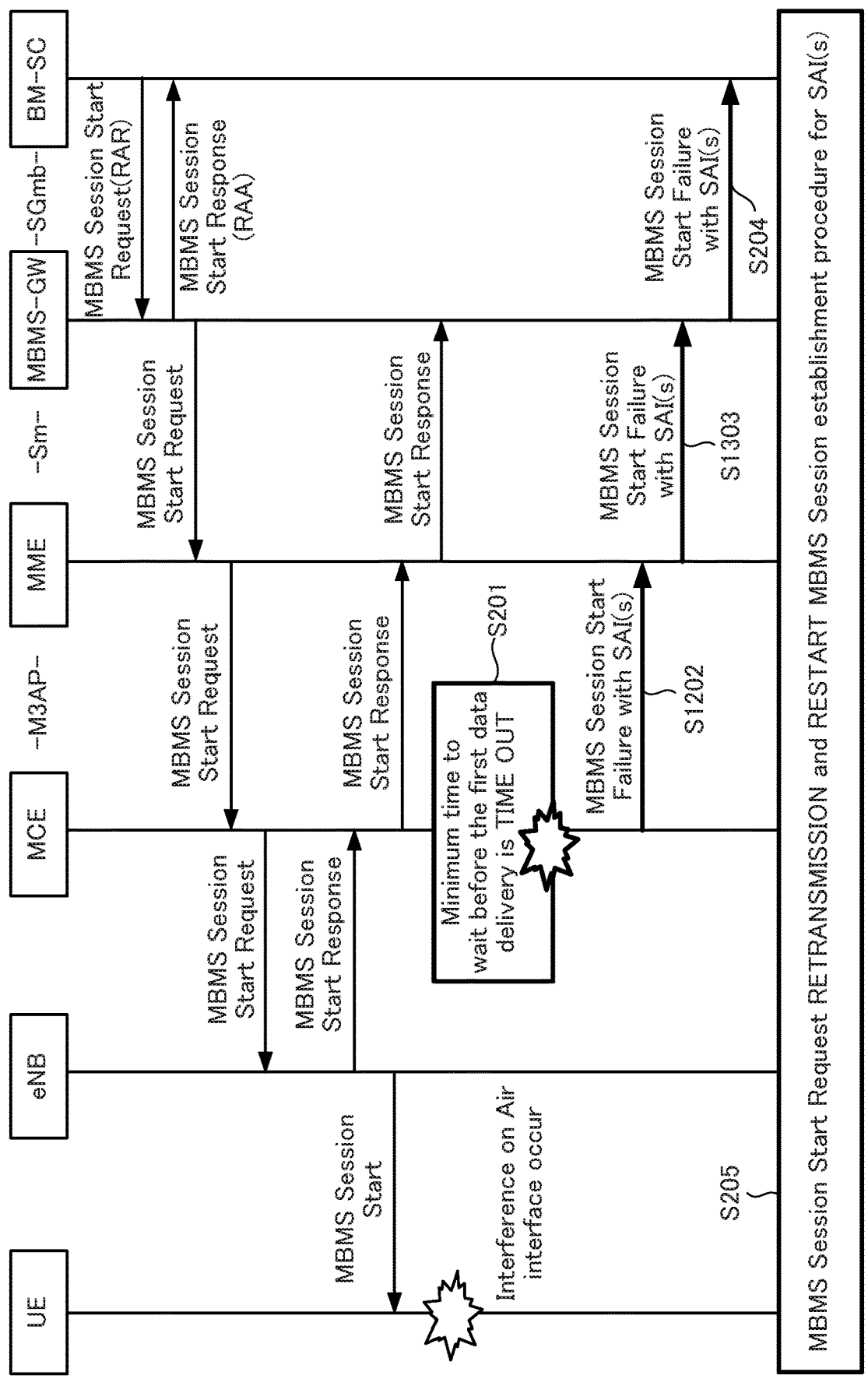
F I G. 13

COMMUNICATION PROCESSING SYSTEM AND GROUP MESSAGE PROCESSING METHOD

CROSS REFERENCE TO RELATED APPLICATIONS

This application is a National Stage of International Application No. PCT/JP2016/075073, filed on Aug. 26, 2016, which claims the benefit of priority from Japanese patent application No. 2015-186303, filed on Sep. 24, 2015.

TECHNICAL FIELD

The present invention relates to a communication processing system and a group message processing method.

BACKGROUND ART

In an IoT (Internet of Things) system, it is necessary to exchange data with an enormous number of MTC (Machine Type Communication) devices connected to the network. Therefore, it is required to reduce the number of data messages from an enormous number of MTC devices or the number of control messages to an enormous number of MTC devices. To achieve this, a method of collectively transmitting messages to MTC devices regionally or constitutionally belonging to the same group is being examined. Non-patent literature 1 (TR 23.888) describes a technique of reducing the number of messages exchanged with MTC devices, avoiding network congestion, and saving resources by grouping devices in the same area or devices having the same function to collectively transmit messages to the same group.

Non-patent literature 2 (TR 23.887) describes some methods as group messaging methods. More specifically, a method of using a CBC (Cell Broadcast Center) and a CBS (Cell Broadcast Service), a method of using an MBMS (Multimedia Broadcast and Multicast Service), and a method of using IP (Internet Protocol) multicast are described. A group message from an SCS (Service Capability Server) is transmitted to MTC devices. If the MTC device cannot receive the group message for some reason such as a temporal failure of a wireless access network, the SCS is notified of it (action in response to group messaging), and executes processing such as retransmission, as needed.

CITATION LIST

Non-Patent Literature

Non-patent literature 1: 3GPP TR 23.888 V11.0.0 (2012-09)
Non-patent literature 2: 3GPP TR 23.887 V12.0.0 (2013-12)

SUMMARY OF THE INVENTION

Technical Problem

In the techniques described in the above literatures, however, a group message from the SCS is finally transmitted from a base station to a plurality of cell groups. However, it may be impossible to establish sessions in some cell groups due to a temporary failure of the wireless access network, and a failure in which MTC devices cannot receive the group message may occur. In this case, a recovery procedure is unclear.

In "6.3.2 Quality-of-Service for EPS" of 3GPP TS 23.246, it is described that "When the MBMS bearer service experience a packet error ratio which is not suitable for the MBMS user service or when prevention of data loss is required, an MBMS user service may perform retransmission of MBMS data over a point-to-point PDP context or PDN connection". However, if point-to-point communication is used, it is impossible to achieve the initial object of avoiding network congestion or overload by reducing signaling.

The present invention enables to provide a technique of solving the above-described problem.

Solution To Problem

One example aspect of the present invention provides a communication processing system forming VPLMN (Visited Public Land Mobile Network), comprising:
a group messaging request acquirer that acquires, from an application, a group messaging request to be distributed to a plurality of devices;
a group messaging request distributer that distributes the group messaging request to the plurality of devices; and
a redistribution instructor that instructs, when receiving no response to the group messaging request from any one device in the plurality of devices within a predetermined time, said group messaging request distributer to redistribute the group messaging request to a service area including the any one device based on error information of the service area.

Another example aspect of the present invention provides a group message processing method for a communication processing system forming VPLMN (Visited Public Land Mobile Network), comprising:
acquiring, from an application, a group messaging request to be distributed to a plurality of devices;
distributing the group messaging request to the plurality of devices; and
instructing, when receiving no response to the group messaging request from any one device in the plurality of devices within a predetermined time, to redistribute the group messaging request to a service area including the any one device based on error information of the service area.

Advantageous Effects Of Invention

According to the present invention, it is possible to cope with a failure while avoiding network congestion or overload by reducing signaling even if a device cannot receive a group message.

BRIEF DESCRIPTION OF DRAWINGS

FIG. 3B is a block diagram showing the configuration of the communication processing system defined by 3GPP TS 23.887 according to the technical premise;

FIG. 3D is a sequence chart showing the operation of a communication processing system defined by 3GPP TS 36.300 according to the technical premise;

FIG. 3E is a sequence chart showing the operation of a communication processing system defined by 3GPP TS 29.061 according to the technical premise;

FIG. 5B is a view showing the control plane of an M3 interface defined by 3GPP TS 36.300 according to the technical premise;

FIG. 5C is a table showing the format of an error indication message that is defined by 3GPP TS 36.444 according to the technical premise, and used in the MCE according to the second example embodiment of the present invention;

FIG. 5D is a table showing the format of Cause that is defined by 3GPP TS 36.444 according to the technical premise, and used in the second example embodiment of the present invention;

FIG. 5E is a table showing Cause Value that is defined by 3GPP TS 29.274 according to the technical premise, and used in the second example embodiment of the present invention;

FIG. 7 is a table showing the format of a MEMS session start request message that is defined by 3GPP TS 29.274 according to the technical premise, and used in the MME according to the second example embodiment of the present invention;

FIG. 9 is a table showing the format of an MEMS session start failure message that is defined by 3GPP TS 36.444 according to the technical premise, and used in the second example embodiment of the present invention;

FIG. 10 is a flowchart illustrating a processing procedure by a BM-SC of the communication processing system according to the second example embodiment of the present invention;

FIG. 13 is a sequence chart showing the operation of a communication processing system according to the fifth example embodiment of the present invention.

DESCRIPTION OF EXAMPLE EMBODIMENTS

Example embodiments of the present invention will now be described in detail with reference to the drawings. It should be noted that the relative arrangement of the components, the numerical expressions and numerical values set forth in these example embodiments do not limit the scope of the present invention unless it is specifically stated otherwise.

First Example Embodiment

A communication processing system 100 according to the first example embodiment of the present invention will be described with reference to FIG. 1. The communication processing system 100 is a system forming a VPLMN (Visited Public Land Mobile Network).

Figure 1:
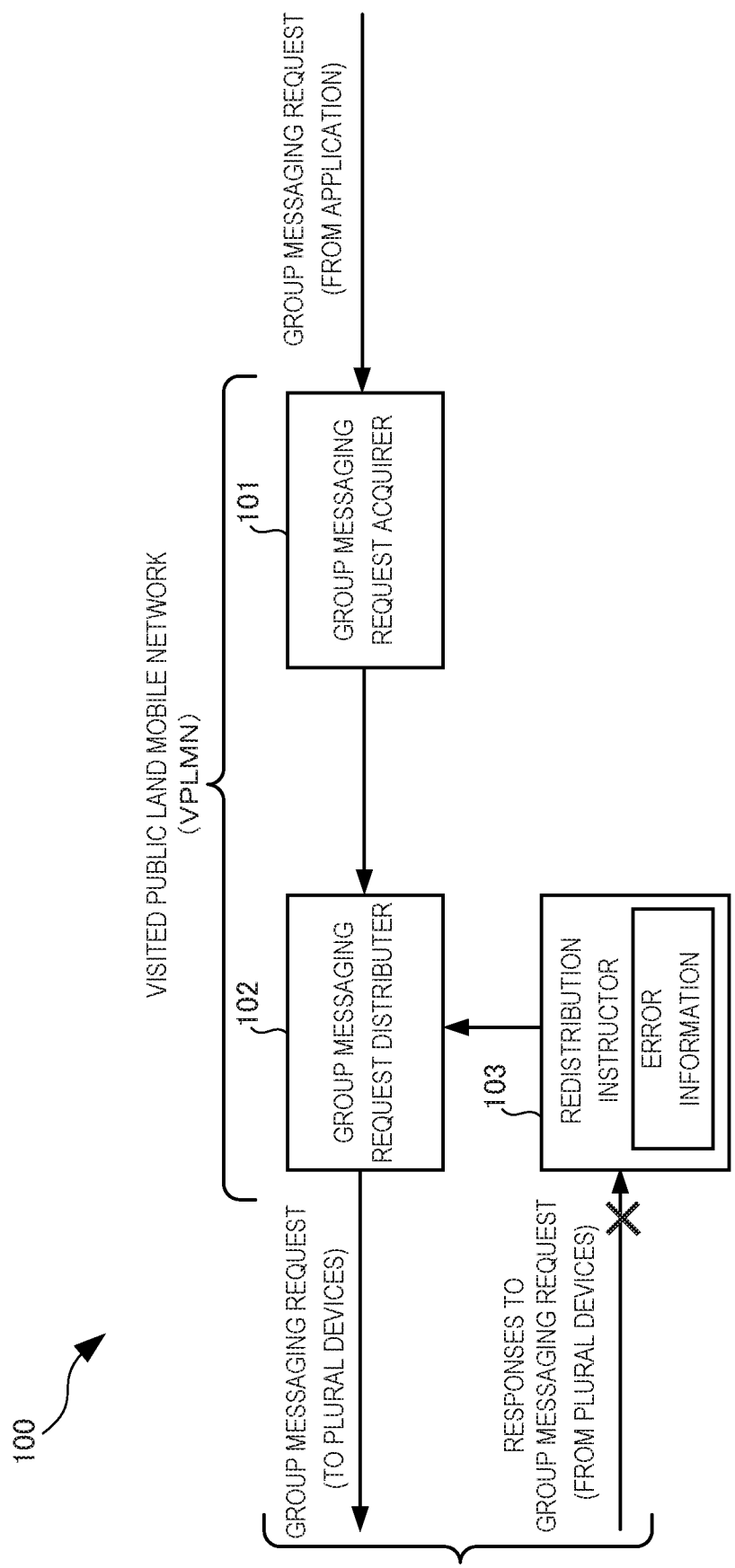
FIG. 1 is a block diagram showing the configuration of a communication processing system according to the first example embodiment of the present invention.

As shown in FIG. 1, the communication processing system 100 includes a group messaging request acquirer 101, a group messaging request distributer 102, and a redistribution instructor 103. The group messaging request acquirer 101 acquires, from an application, a group messaging request to be distributed to a plurality of devices. The group messaging request distributer 102 distributes the group messaging request to the plurality of devices. The retransmission instructor 103 instructs, when receiving no response to the group messaging request from any one device in the plurality of devices within a predetermined time, the group messaging request distributer to distribute the group messaging request to a service area including the any one device based on error information of the service area.

According to this example embodiment, a group messaging request is redistributed in the VPLMN (Visited Public Land Mobile Network) at the time of occurrence of an error. Therefore, even if the device cannot receive the group messaging request, it is possible to cope with a failure while avoiding network congestion or overload by reducing signaling.

Second Example Embodiment

A communication processing system according to the second example embodiment of the present invention will be described next. Even if an error of a device occurs, the communication processing system according to this example embodiment implements, in a VPLMN (Visited Public Land Mobile Network), retransmission of a group message to a device group, which has been transmitted from an application via an HPLMN (Home Public Land Mobile Network). Even if a device cannot receive a request of the group message, it is possible to cope with a failure while avoiding network congestion or overload by reducing signaling.

<<Technical Premise>>

(Group Messaging between SCS and UE)

Figure 3A:
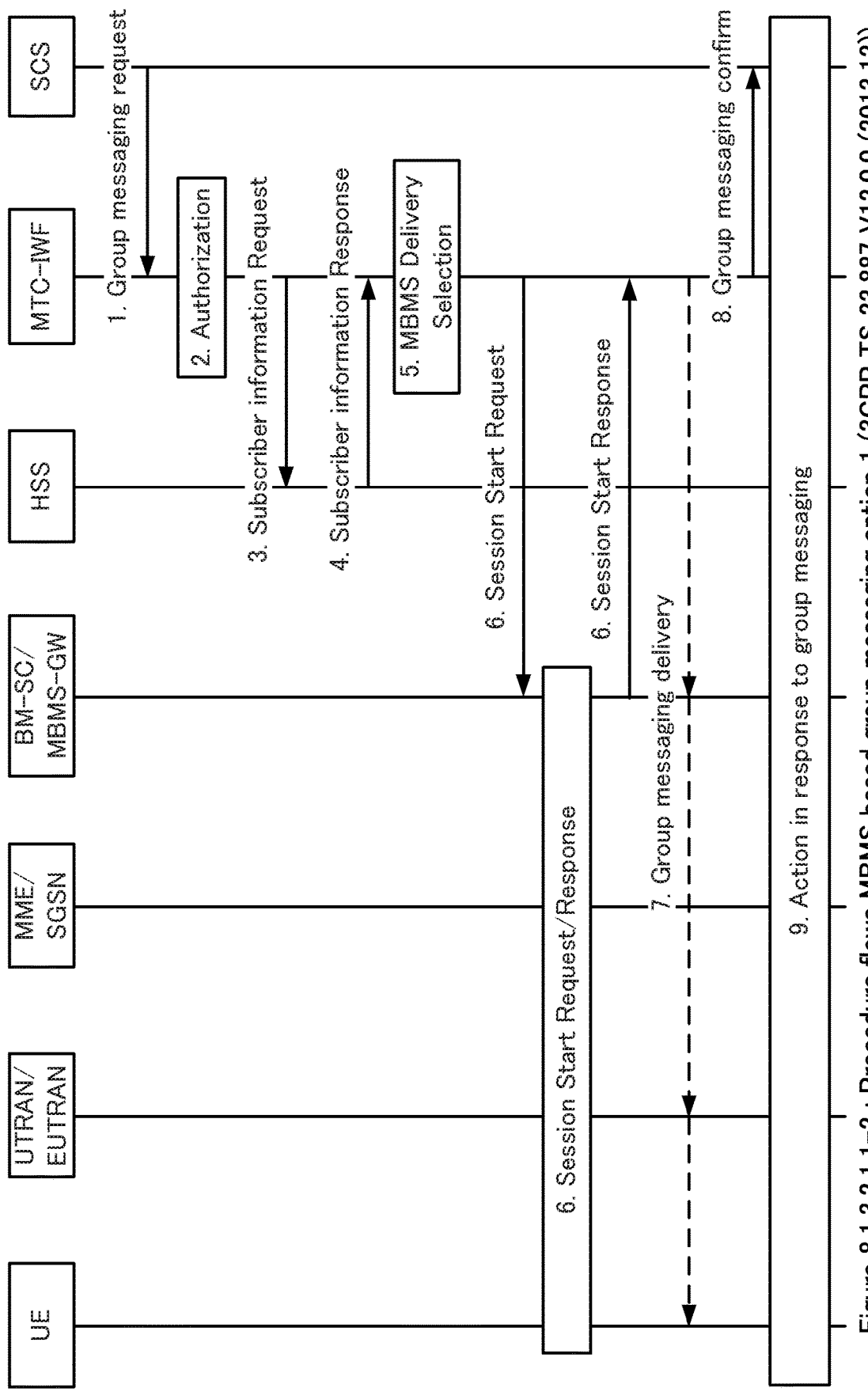
FIG. 3A is a sequence chart showing the operation of a communication processing system defined by 3GPP TS 23.887 according to a technical premise.
Figure 8:
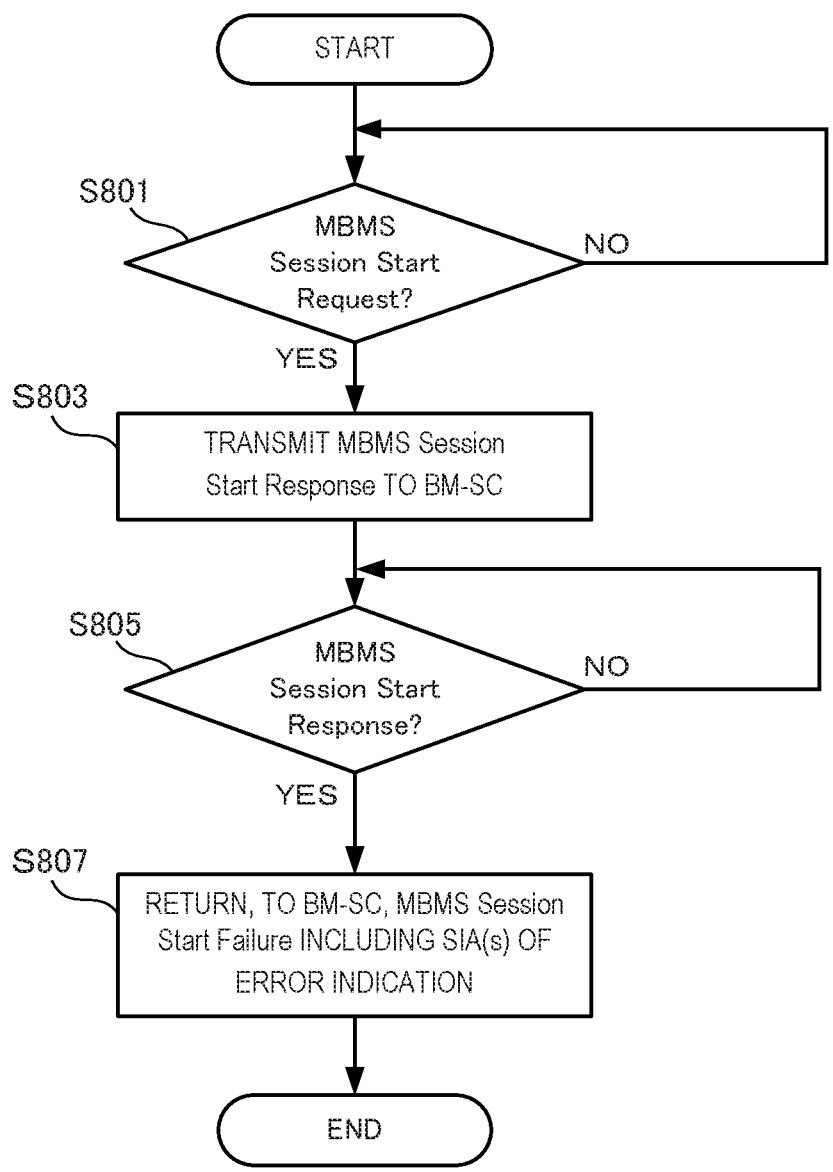
FIG. 8 is a flowchart illustrating a processing procedure by an MBMS-GW of the communication processing system according to the second example embodiment of the present invention.

The operation sequence of an MTC-IWF (Machine Type Communication-Interworking Function) defined by 3GPP (Third Generation Partnership Project) TS 23.887 according to the technical premise will be described with reference to FIG. 3A. In FIG. 3A, FIG. 8.1.3.2.1.1-2 shows a group messaging procedure using the MBMS. Upon receiving a group messaging request from an external AS (Application Server), an SCS (Service Capability Server) sends the group messaging request to the MTC-IWF in a 3GPP core network.

The group messaging request includes: 1) application layer data; 2) a group identifier such as an external group identifier; and 3) optionally, the location/area and RAT (Radio Access Technology) of a group messaging delivery destination.

Upon receiving the group messaging request from the SCS, the MTC-IWF checks whether group messaging by the SCS is authorized. More specifically, the MTC-IWF sends a subscriber information request including an external group ID and SCS ID to an HSS/HLR (Home Subscriber Server/ Home Location Register). This is done to confirm whether group messaging to a specific group by the SCS is authorized and obtain subscription information for the specific group. The HSS/HLR returns, to the MTC-IWF, as a subscriber information response, a message delivery method such as the CBS or MBMS based on subscription information and a preset policy. Note that if group messaging by the SCS is not authorized or the subscription information is invalid, the MTC-IWF transmits, to the SCS, a group messaging confirmation response displaying the reason, and then stops the group messaging procedure; otherwise, the procedure advances.

The MTC-IWF selects a delivery method such as the CBS, MBMS, or core network based on the preset policy and the information received from the HSS/HLR. If the MTC-IWF selects the MBMS, it transmits, to a BM-SC/ MBMS-GW (Broadcast Multimedia-Service Center/ MBMS-Gateway), a session start request including MBMS service area information. Upon receiving this request, the MBMS-GW performs a session start procedure with an MME/SGSN, thereby establishing connection to MTC devices. After that, the MTC-IWF starts to transmit application layer data. However, for further optimization, the session start request may include the application layer data.

Subsequently, a group message from the SCS is transmitted to the MTC devices. Note that if the MTC device cannot receive the group message for some reason such as a temporal failure of a wireless access network, the SCS is notified of it ("action in response to group messaging"), and executes processing such as retransmission, as needed.

(System Configuration)

FIG. 3B is a block diagram showing the configuration of a communication processing system defined by 3GPP TS 23.887 according to the technical premise. Note that FIG. 3B shows the standard MBMS-based group messaging architecture, and a detailed description of components will be omitted.

(Group Messaging between BM-SC and UE)

Figure 3C:
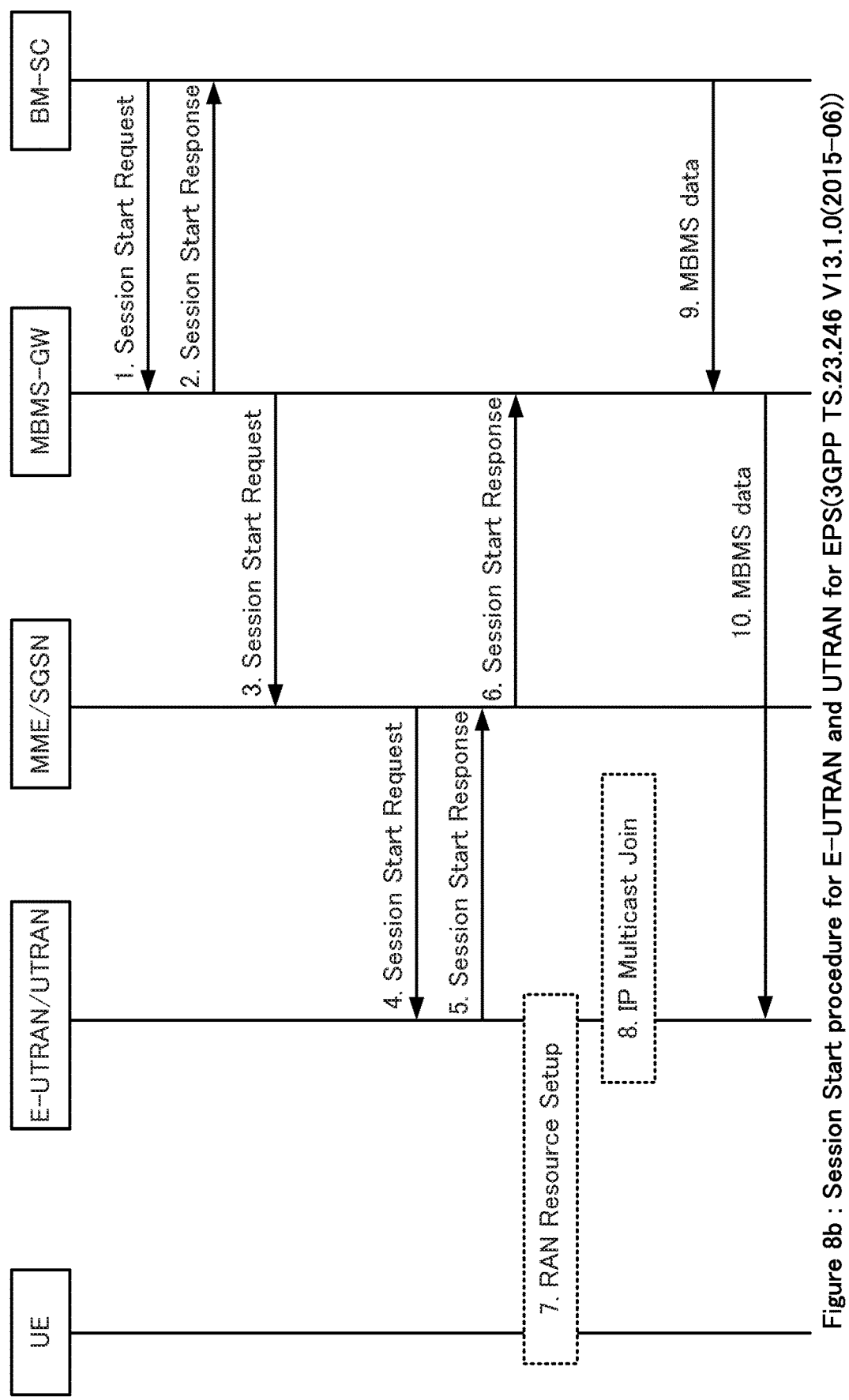
FIG. 3C is a sequence chart showing the operation of a communication processing system defined by 3GPP TS 23.246 according to the technical premise.

FIG. 3C is a sequence chart showing the operation of a communication processing system defined by 3GPP TS 23.246 according to the technical premise. Note that FIG. 3C shows a standard operation sequence in the VPLMN (Visited Public Land Mobile Network) according to this example embodiment, and a detailed description thereof will be omitted. In the standard operation sequence shown in FIG. 3C, if an error occurs due to a device state during session start processing, reprocessing cannot be performed in the VPLMN (Visited Public Land Mobile Network), and thus group messaging is requested again in the HPLMN (Home Public Land Mobile Network).

(Group Messaging between MME and UE)

FIG. 3D is a sequence chart showing the operation of a communication processing system defined by 3GPP TS 36.300 according to the technical premise. Note that FIG. 3D shows a standard operation sequence between the MME and the UE according to this example embodiment, and a detailed description thereof will be omitted. In the standard operation sequence shown in FIG. 3D, even if an error occurs due to a device state during session start processing, it is impossible to grasp the error in real time, and thus group messaging is requested again in the HPLMN (Home Public Land Mobile Network) after the end of group messaging processing.

(Group Messaging between BM-SC and MBMS-GW)

FIG. 3E is a sequence chart showing the operation of a communication processing system defined by 3GPP TS 29.061 according to the technical premise. Note that FIG. 3E shows a standard operation sequence between the BM-SC and MBMS-GW, and a detailed description thereof will be omitted. In the standard operation sequence shown in FIG. 3E, even if an error occurs due to a device state during session start processing, no message for error notification is provided, and thus group messaging is requested again in the HPLMN (Home Public Land Mobile Network) after the end of group messaging processing.

<<Outline of this Example Embodiment>>

In this example embodiment, the MCE (Multi-Cell/Multicast Coordinate Entity) logically defined between a base station and an MME detects the presence/absence of session establishment for each cell group to which a group message has been transmitted, and session establishment failure information is transmitted to the BM-SC via the MME for each cell group with which a session cannot be established within a set time. Note that the MCE is described in 3GPP TS 23.300. The BM-SC redistributes the group message request to each cell group for which a session establishment failure has occurred, thereby more reliably delivering the group message to MTC devices belonging to the cell group without using point-to-point communication. That is, in a session establishment procedure by an MTC device included in a cell group and a network node such as a BM-SC/ MBMS-GW, MME, or UTRAN/E-UTRAN, if a session with an MTC device in a given cell group cannot be established due to, for example, fading or interference in a wireless section, a time out (minimum time to wait before the first data delivery timer) is primarily detected between the base station and the MCE. This is transmitted as session establishment failure information to the MB-SC via the MME on a cell group basis (SAI basis). Upon receiving the session establishment failure information, the BM-SC redistributes the group message request to each cell group for which the failure occurrence notification has been received.

<<Operation Sequence>>

Figure 2:
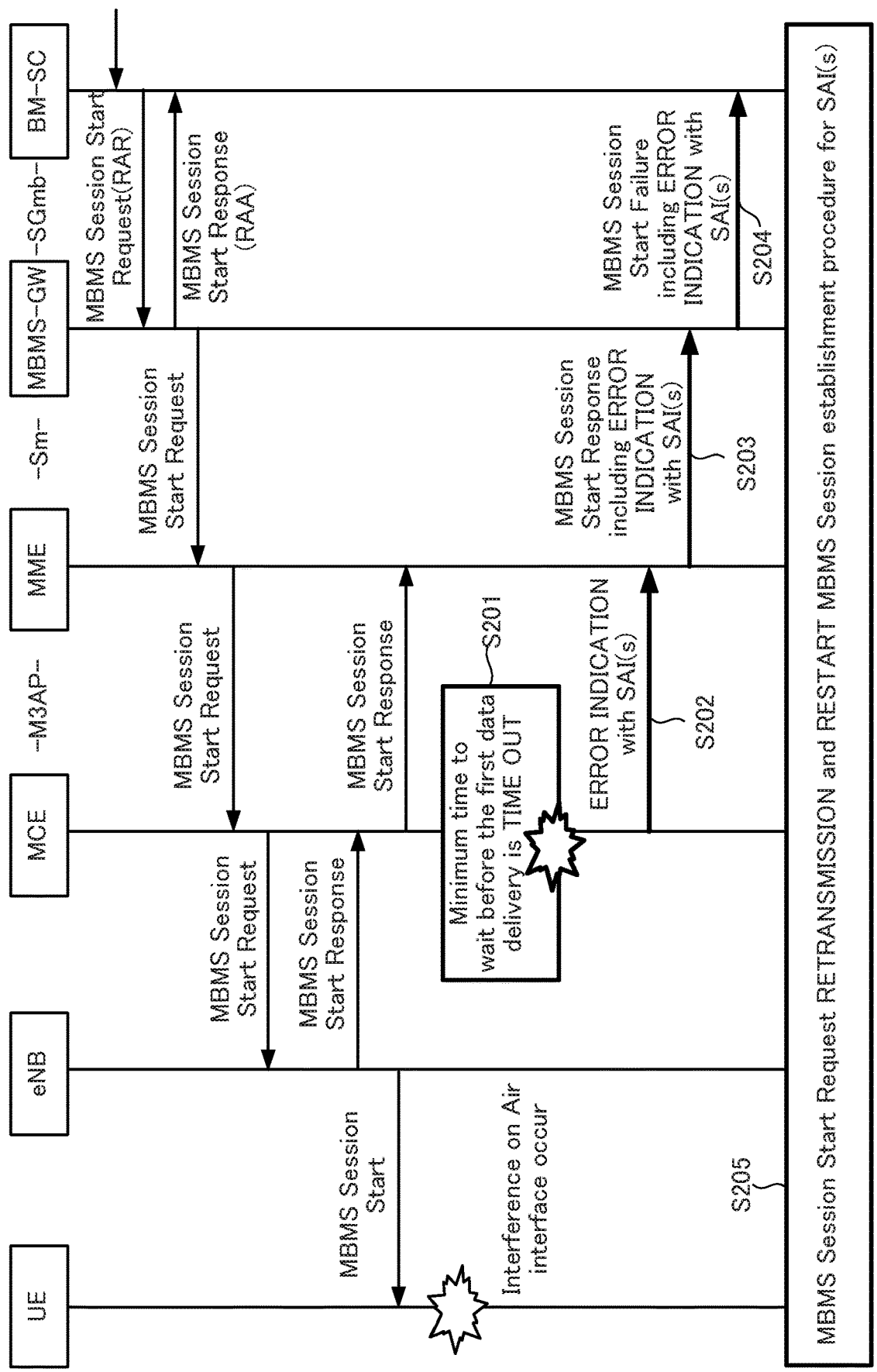
FIG. 2 is a sequence chart showing the operation of a communication processing system according to the second example embodiment of the present invention.

FIG. 2 is a sequence chart showing the operation of the communication processing system according to this example embodiment. Note that in FIG. 2, a description of the same sequence operations as those shown in FIG. 3C according to the technical premise will be omitted. In this example embodiment, changed or added sequence operations are added with step numbers, and will be described below. This is the group message processing method for the communication processing system serving as a core network according to this example embodiment.

In step S201, the MCE detects that group message session start processing ends within a predetermined time (minimum standby time) and no first data delivery is performed (time-out). In step S202, the MCE transmits, to the MME, an error indication message with a service area identifier (SAI (SAIs)) for which a time-out has occurred. Upon receiving the error indication message, the MME transmits, in step S203, to the MBMS-GW, an MBMS session start response including the SAI (SAIs) of the error indication message. Upon receiving the MBMS session start response including the SAI (SAIs), the MBMS-GW transmits, in step S204, to the BM-SC, an MBMS session start failure message newly defined between the MBMS-GW and the BM-SC and including the SAI (SAIs) of the error indication message. Upon receiving the MBMS session start failure message, the BM-SC restarts, in step S205, the group message session start processing for the SAI (SAIs).

Note that acquisition in the BM-SC in "6. session start request" of the MTC-IWF in FIG. 3A corresponds to a processing function as the group messaging request acquirer 101 shown in FIG. 1.

Transmission of "MBMS session start request" from the BM-SC to the UE in FIG. 2 corresponds to a processing function as the group messaging request distributer 102 shown in FIG. 1.

Processes in steps S201 to S205 of FIG. 2 correspond to a processing function as the retransmission instructor 103 shown in FIG. 1. Among others, the processes, in the MCE, of detecting a time-out in step S201 and transmitting, to the MME, the error indication message with the service area identifier (SAI (SAIs)) for which a time-out has occurred correspond to a processing function as an error information generator.

Note that a device with which a session has been established is controlled to pass through the subsequent group message session start processing.

More specifically, the operation sequence shown in FIG. 2 includes the following processes.

(1) Between MCE and MME (M3 Interface/TS 36.300/TS 36.444)

An interface between the MCE and the MME is defined as an M3 interface, and its protocol is defined as M3AP (M3 Application Protocol) by TS 36.300 and TS 36.444. In M3AP, the error indication message and its cause value are defined by a table shown below. If "minimum wait timer time out" is added after "miscellaneous cause" as a new cause value, and the MCE detects a time-out of the minimum wait timer, the MME is notified of the error indication message including "minimum wait timer time out" as a cause value.

(2) Between MME and MBMS-GW (Sm Interface)

In 7.13 MBMS Message of TS 29.274, a Sm interface is defined, in which the MBMS session start request and MBMS session start response messages are defined. In the MBMS session start response message, as a result for the request message, cause values are defined in Table 8.4-1. In Table 8.4-1, since cause values 240 to 255 are available for future release, one of the cause values, for example, the cause value 240 is added as "minimum wait timer time out". Upon receiving the error indication message from the MCE, the MME notifies the MBMS-GW of the MBMS session start response message including "minimum wait timer time out" as a cause value.

(3) Between MBMS-GW and BM-SC (SGmb Interface)

In 20.3.1 of TS 29.061, an MBMS session start procedure is defined. Upon receiving a session start request (RAR: Re-Auth-Request Command) from the BM-SC, the MBSC-GW returns an MBMS session start response (RAA: Re-Auth-Answer Command). Since, however, the MBMS session start response (RAA: Re-Auth-Answer Command) immediately responds to the session start request (RAR: Re-Auth-Request Command), no error indication message can be added.

Therefore, an MBMS session start failure message is newly defined to include the error indication message between the MBMS-GW and the BM-SC. Note that the MBMS session start failure message is a response message defined between the MCE and the MME (M3 interface). That is, upon receiving the MBMS session start response message, the MBMS-GW notifies the BM-SC of the MBMS session start failure message including the error indication message.

(4) Upon receiving the MBMS session start failure message, the MB-SC retransmits the session start request for the received SAI (SAIs).

(Service Area Identifier (SAI (SAIs)))

According to non-patent literature 2 (TR 23.887), there are the BM-SC and MBMS-GW as nodes supporting the MBMS. The BM-SC receives a "session start request" from the MTC-IWF, and establishes a session with the MTC device in cooperation with network nodes such as the MBMS-GW, MME, and UTRAN/E-UTRAN. According to TS 23.246, an MBMS service area is defined as an area where specific MBMS session data is transmitted. According to 3GPP TS 23.003, the MBMS service area includes at most 256 SAIs (Service Area Identities). The SAI (SAIs) is used to identify a cell group. That is, the cell group can be addressed by the SAI (SAIs). Note that the SAI (SAIs) is described in TS 23.003. A value between 0 and 65,535 can be designated as the value of the SAI (SAIs). However, "0" is special, and is used to designate all the cell groups. That is, "0" can be used for a broadcast service.

Note that in this example embodiment, the reason why the SAI (SAIs) is described is that a case in which an error occurs in only one service area and a case in which an error occurs in a plurality of service areas are assumed.

<<Processing Procedure by MCE>>

Figure 4:
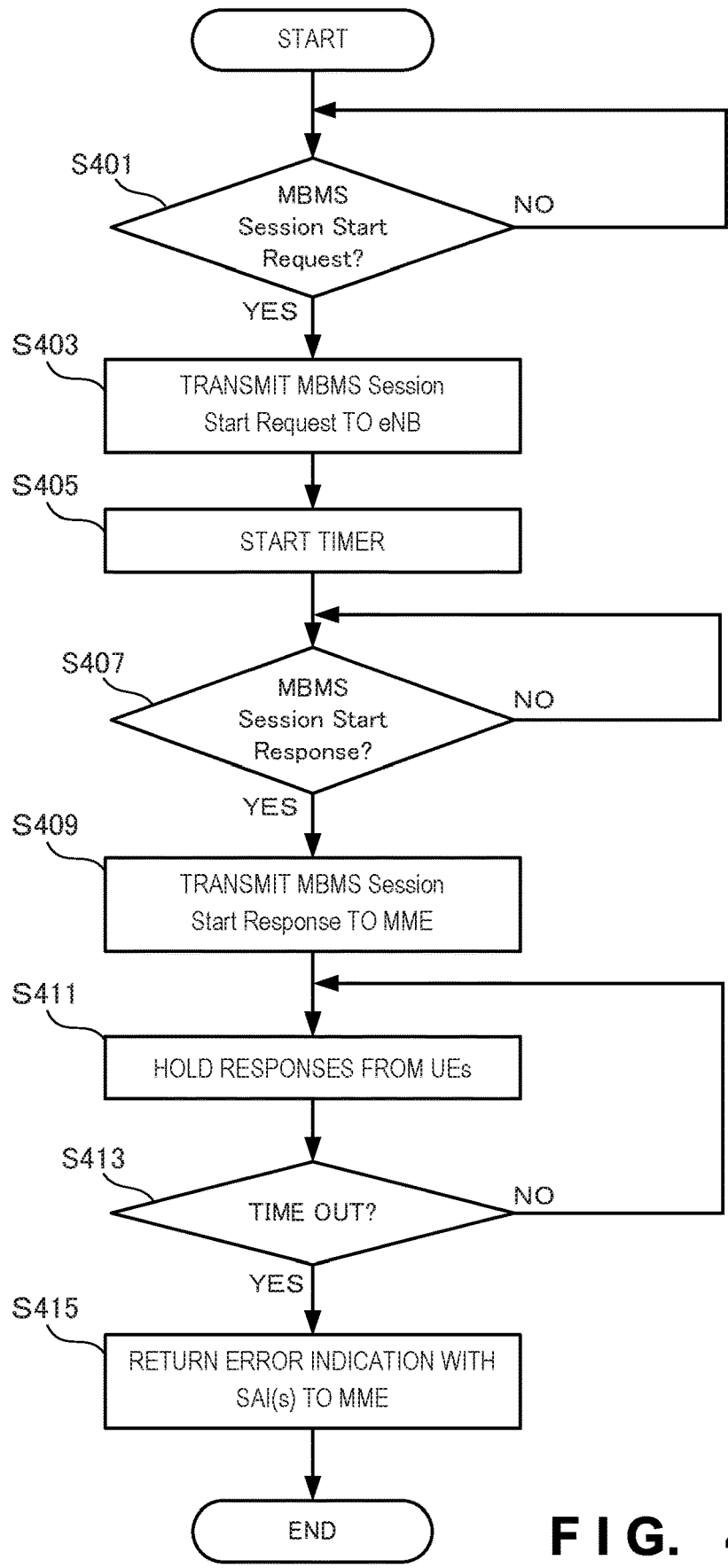
FIG. 4 is a flowchart illustrating a processing procedure by an MCE of the communication processing system according to the second example embodiment of the present invention.

FIG. 4 is a flowchart illustrating a processing procedure by the MCE of the communication processing system according to this example embodiment. This flowchart is executed by a CPU (Central Processing Unit) that controls the MCE alone or a CPU that integrally controls the operation of the VPLMN (Visited Public Land Mobile Network), thereby implementing the functional units. For example, the respective functions of the VPLMN (Visited Public Land Mobile Network) may be implemented by a virtual network.

In step S401, the MCE waits for an MBMS session start request from the MME. Upon receiving the MBMS session start request from the MME, the MCE transmits, in step S403, the MBMS session start request to an eNB. In step S405, the MCE starts a timer for detecting a time-out of a session response.

In step S407, the MCE waits for an MBMS session start response from the eNB. If the MBMS session start response is received from the eNB, the MCE returns, in step S409, the MBMS session start response to the MME. In steps S411 and S413, the MCE sequentially holds responses from devices (UEs) until a time-out of the timer that has started in step S405 occurs.

When a time-out of the timer occurs, the MCE issues, in step S415, to the MME, an error indication message with the service area identifier (SAI (SAIs)) for which a time-out occurs.

(Arrangement of MCE)

Figure 5A:
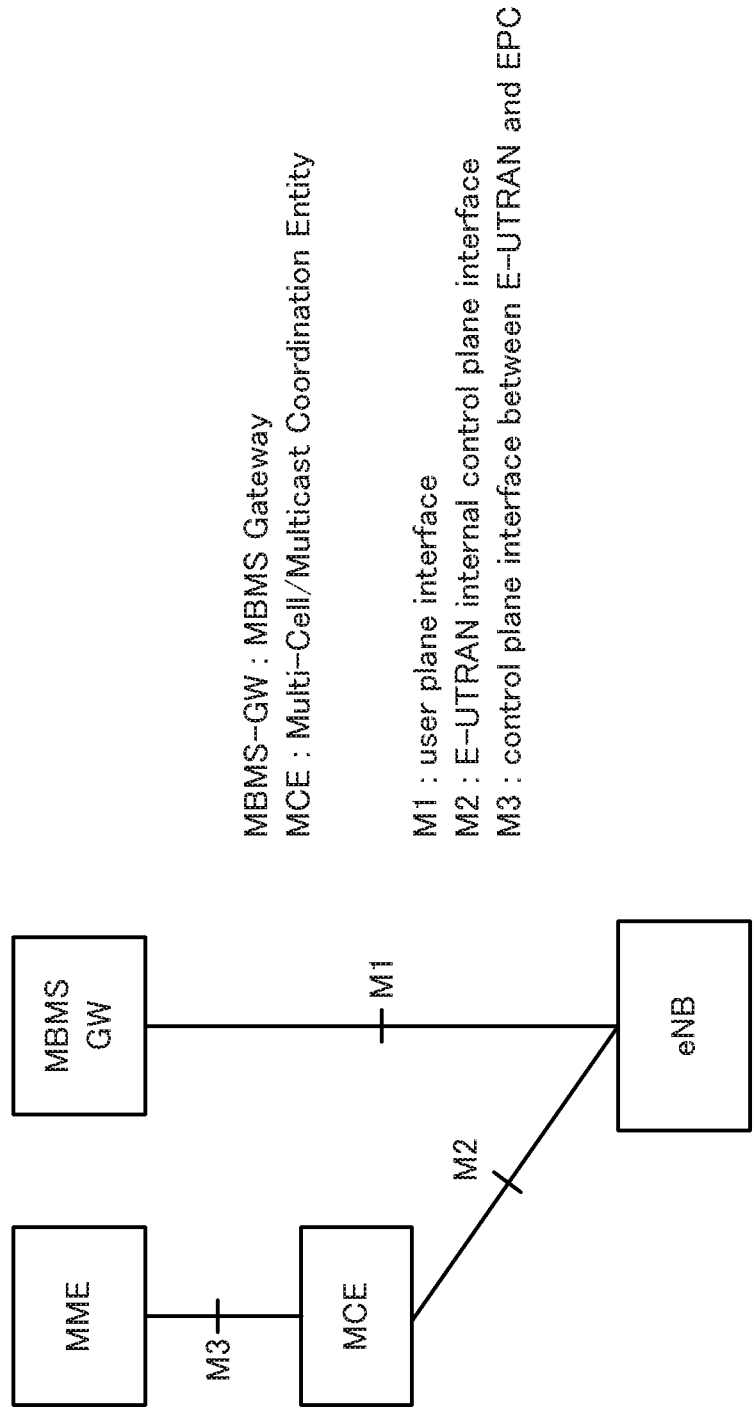
FIG. 5A is a block diagram showing the arrangement of an MCE in the communication processing system defined by 3GPP TS 36.300 according to the technical premise.

FIG. 5A is a block diagram showing the arrangement of the MCE in the communication processing system defined by 3GPP TS 36.300 according to the technical premise. Note that FIG. 5A shows the standard MBMS logical architecture, and a detailed description thereof will be omitted.

(M3 Interface)

FIG. 5B is a view showing the control plane of the M3 interface defined by 3GPP TS 36.300 according to the technical premise. Note that FIG. 5B shows the standard M3 interface control plane, and a detailed description thereof will be omitted.

(Error Indication)

FIG. 5C is a table showing the format of the error indication message that is defined by 3GPP TS 36.444 according to the technical premise, and used in the MCE according to this example embodiment. That is, in this example embodiment, a cause 531 of the error indication message is used as a region in which the service area identifier (SAI (SAIs)) for which a time-out has occurred is written.

FIG. 5D is a table showing the format of Cause that is defined by 3GPP TS 36.444 according to the technical premise, and used in this example embodiment. FIG. 5E is a table showing Cause Value that is defined by 3GPP TS 29.274 according to the technical premise, and used in this example embodiment. In this example embodiment, among the causes, causes 551 (decimal values 121 to 239 and 240 to 256) are used as a region where the SAI (SAIs) is written.

<<Processing Procedure by MME>>

Figure 6:
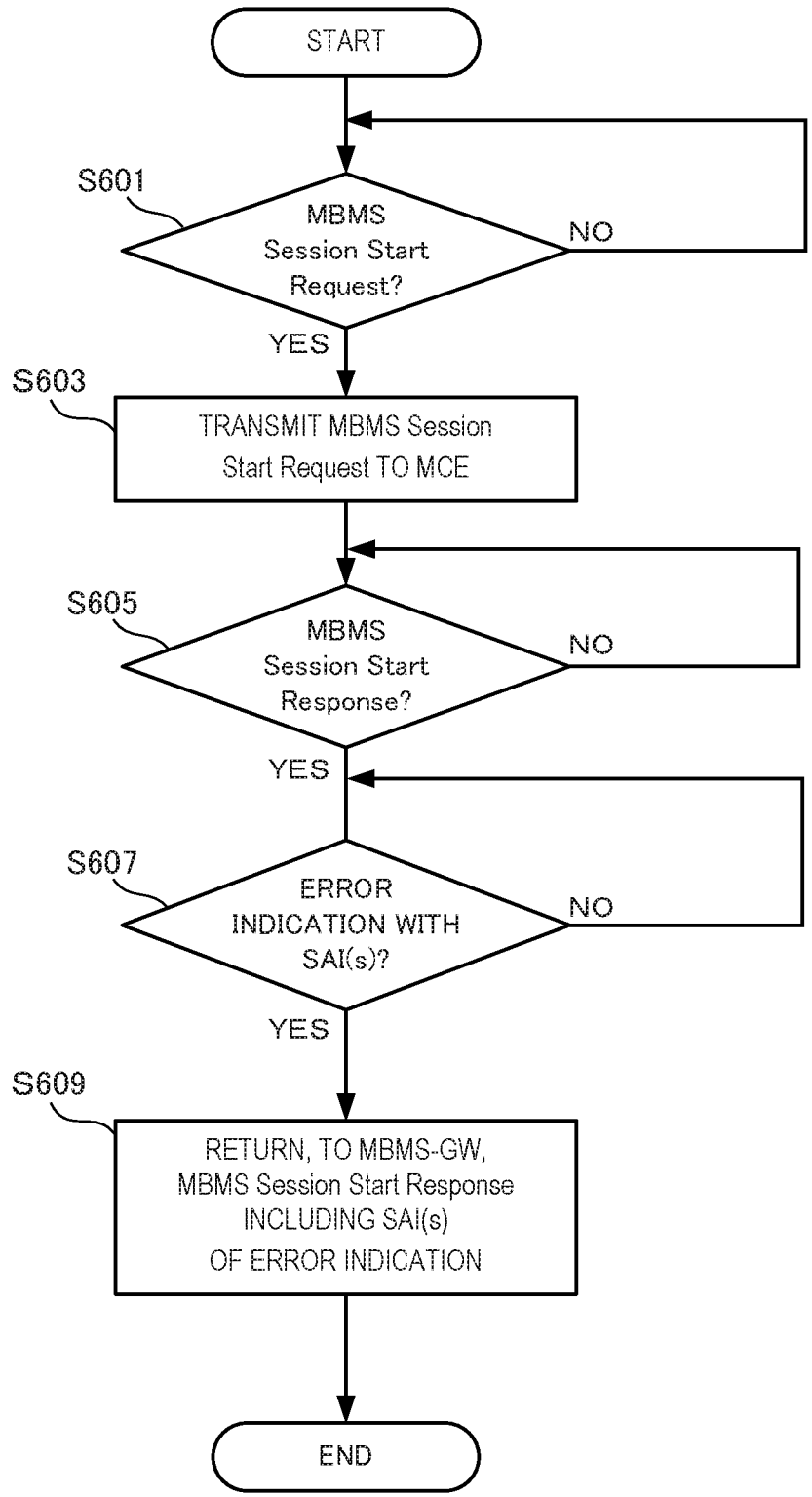
FIG. 6 is a flowchart illustrating a processing procedure by an MME of the communication processing system according to the second example embodiment of the present invention.

FIG. 6 is a flowchart illustrating a processing procedure by the MME of the communication processing system according to this example embodiment.

In step S601, the MME waits for an MBMS session start request from the MBMS-GW. Upon receiving the MBMS session start request from the MBMS-GW, the MME transmits, in step S603, the MBMS session start request to the MCE. In step S605, the MME waits for an MBMS session start response from the MCE.

Upon receiving the MBMS session start response from the MCE, the MME waits for an error indication message with an SAI (SAIs) in step S607. If no error indication message is received even after a predetermined time elapses, an MBMS session start response indicating that a group message session has normally been established may be returned to the MBMS-GW. Upon receiving the error indication message with the SAI (SAIs) from the MCE, the MME transmits, in step S609, the MBMS session start response including the SAI (SAIs) of the error indication message to the MBMS-GW.

(MEMS Session Start Response)

FIG. 7 is a table showing the format of a MEMS session start response message that is defined by 3GPP TS 29.274 according to the technical premise, and used in the MME according to this example embodiment. A cause 701 shown in FIG. 7 stores the SAI (SAIs) of the error indication message, and is transmitted to the MBMS-GW.

<<Processing Procedure by MBMS-GW>>

FIG. 8 is a flowchart illustrating a processing procedure by the MBMS-GW of the communication processing system according to this example embodiment.

In step S801, the MBMS-GW waits for an MBMS session start request from the BM-SC. Upon receiving the MBMS session start request from the BM-SC, the MBMS-GW returns, in step S803, an MBMS session start response to the MB-SC. In step S805, the MBMS-GW waits for an MBMS session start response from the MME.

Upon receiving the MBMS session start response from the MME, the MBMS-GW transmits, in step S807, to the BM-SC, a message obtained by including, in a newly defined MBMS session start failure message, information included in the MBMS session start response from the MME. If the MBMS session start response from the MME includes the error indication message with the SAI (SAIs), it is transmitted to the BM-SC using an MBMS session start failure message.

(MEMS Session Start Failure)

FIG. 9 is a table showing the format of the MEMS session start failure message that is defined by 3GPP TS 36.444 according to the technical premise, and used in this example embodiment. The MEMS session start failure message includes a cause 901. Since the type of the cause is the same as that of the cause 531 of the error indication message, the SAI (SAIs) of the error indication message can be stored, and transmitted.

<<Processing Procedure by BM-SC>>

FIG. 10 is a flowchart illustrating a processing procedure by the BM-SC of the communication processing system according to this example embodiment.

In step S1001, the BM-SC waits for a MEMS session start failure message from the MBMS-GW. Upon receiving the MEMS session start failure message from the MBMS-GW, the BM-SC acquires, in step S1003, the SAI (SAIs) included in the MEMS session start failure message. In step S1005, the BM-SC retransmits the MEMS session start request from the MBMS-GW to the UEs based on the SAI (SAIs).

According to this example embodiment, if a device cannot receive the group message request, the BM-SC in the VPLMN (Visited Public Land Mobile Network) redistributes the group message request at the time of occurrence of an error. Therefore, it is possible to cope with a failure while avoiding network congestion or overload by reducing signaling.

Third Example Embodiment

A communication processing system according to the third example embodiment of the present invention will be described next. The communication processing system according to this example embodiment is different from that according to the second example embodiment in that if a response indicating that a failure has occurred in a plurality of cell groups is returned, a group message retransmission order is selected. The remaining components and operations are the same as those in the second example embodiment. Hence, the same reference numerals denote the same components and operations, and a detailed description thereof will be omitted.

<<Processing Procedure by BM-SC>>

Figure 11:
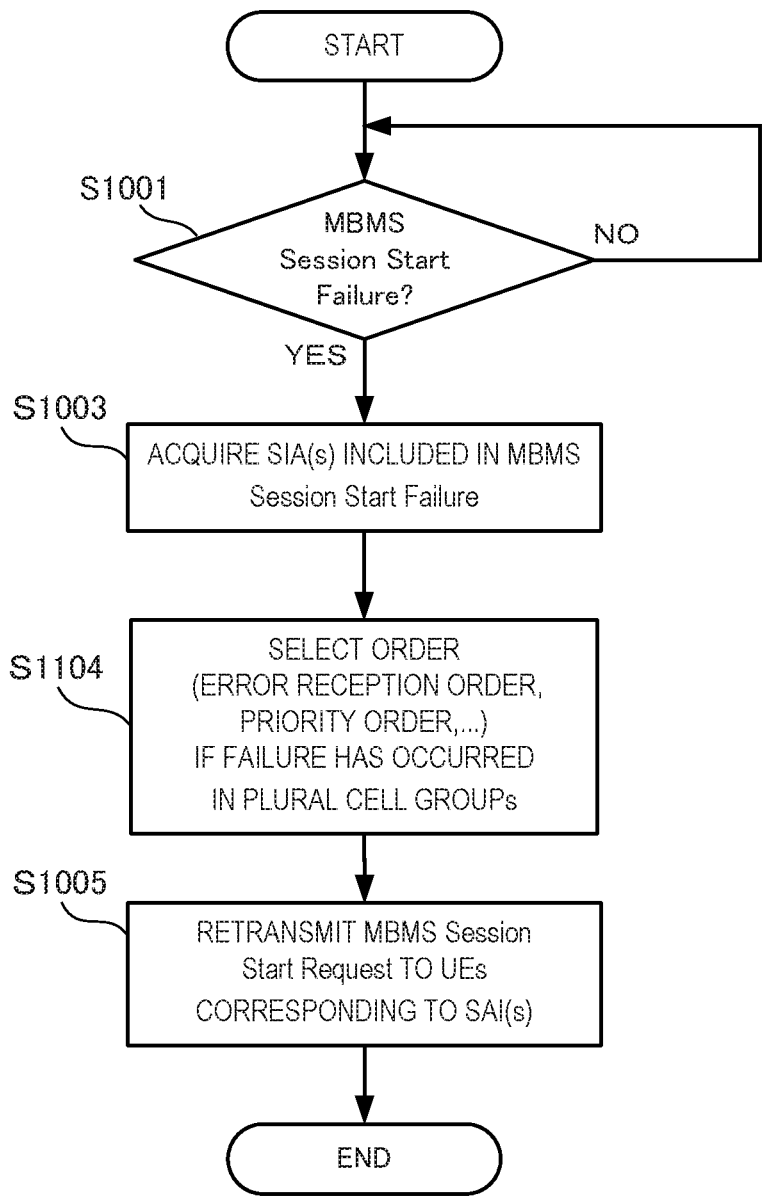
FIG. 11 is a flowchart illustrating a processing procedure by a BM-SC of a communication processing system according to the third example embodiment of the present invention.

FIG. 11 is a flowchart illustrating a processing procedure by the BM-SC of the communication processing system according to this example embodiment. Note that in FIG. 11, the same step numbers as those in FIG. 10 denote the same steps and a repetitive description thereof will be omitted.

In step S1104, if a failure has occurred in a plurality of cell groups, the BM-SC selects, as a group message retransmission order, an error reception order or a priority order according to priority levels.

According to this example embodiment, group message requests are redistributed in the error reception order or priority order. Therefore, it is possible to cope with a failure while more efficiently avoiding network congestion or overload by reducing signaling.

Fourth Example Embodiment

A communication processing system according to the fourth example embodiment of the present invention will be described next. The communication processing system according to this example embodiment is different from those according to the second and third example embodiments in that transmission of an SAI (SAIs) for which a start time-out of a session from an MCE to an MME has occurred is performed using a MEMS session start failure message. The remaining components and operations are the same as those in the second and third example embodiments. Hence, the same reference numerals denote the same components and operations, and a detailed description thereof will be omitted.

<<Operation Sequence>>

Figure 12:
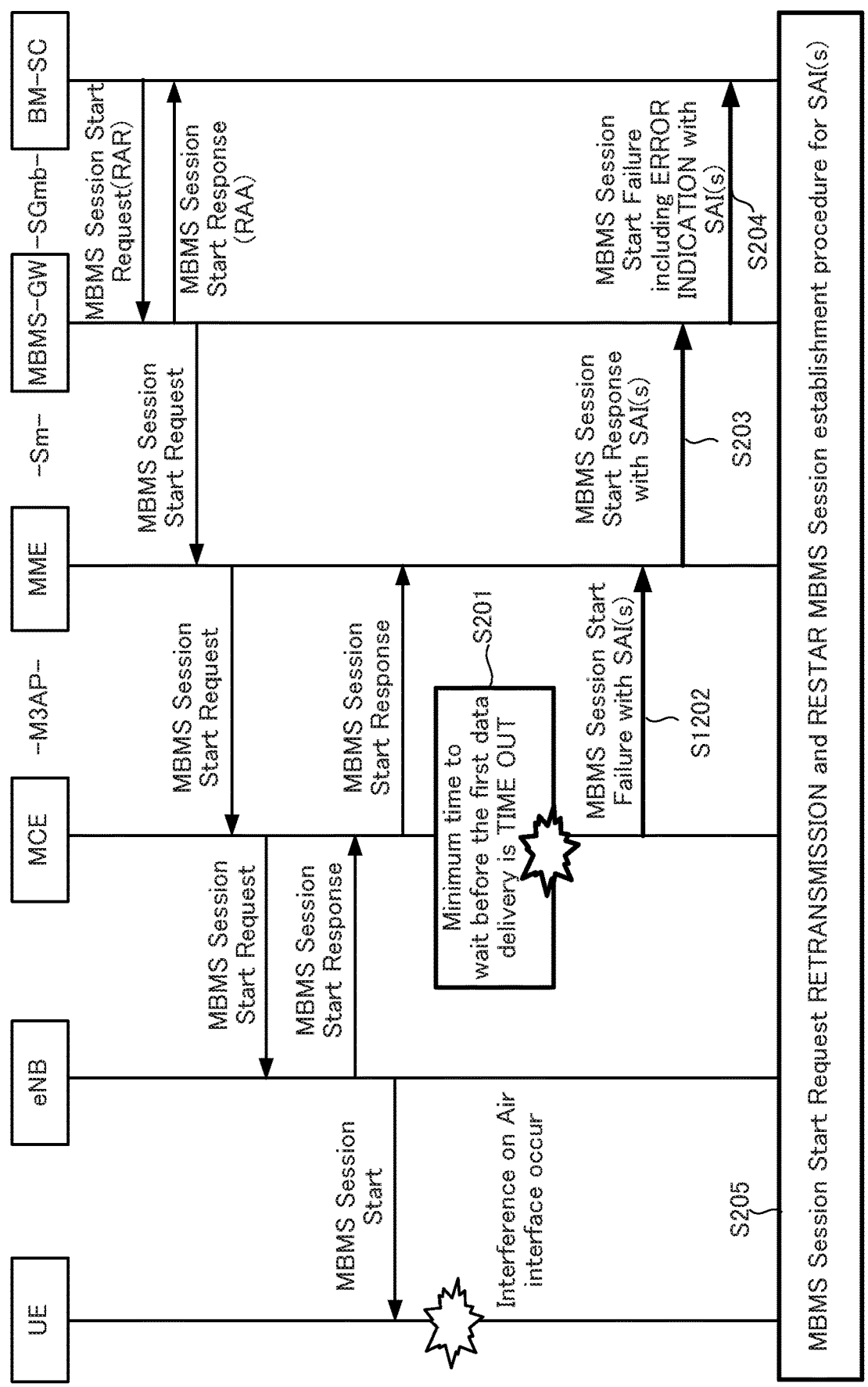
FIG. 12 is a sequence chart showing the operation of a communication processing system according to the fourth example embodiment of the present invention.

FIG. 12 is a sequence chart showing the operation of the communication processing system according to this example embodiment. Note that in FIG. 12, the same step numbers as those in FIG. 2 denote the same steps and a repetitive description thereof will be omitted.

In step S1202, an MCE writes, in the cause of the MEMS session start failure message, transmission of the SAI (SAIs) for which a session start time-out has occurred, and transmits it to an MME.

In this example embodiment as well, similarly to the second example embodiment, if a device cannot receive a group message, a BM-SC in a VPLMN (Visited Public Land Mobile Network) redistributes the group message request at the time of occurrence of an error. Therefore, it is possible to cope with a failure while avoiding network congestion or overload by reducing signaling.

Fifth Example Embodiment

A communication processing system according to the fifth example embodiment of the present invention will be described next. The communication processing system according to this example embodiment is different from those according to the second to fourth example embodiments in that transmission of an SAI (SAIs) for which a start time-out of a session from an MME to an MBMS-GW has occurred is performed using a MEMS session start failure message. The remaining components and operations are the same as those in the second to fourth example embodiments. Hence, the same reference numerals denote the same components and operations, and a detailed description thereof will be omitted.

<<Operation Sequence>>

FIG. 13 is a sequence chart showing the operation of the communication processing system according to this example embodiment. Note that in FIG. 13, the same step numbers as those in FIGS. 2 and 12 denote the same steps and a repetitive description thereof will be omitted.

In step S1303, the MME writes, in the cause of the MEMS session start failure message, transmission of the SAI (SAIs) for which a session start time-out has occurred, and transmits it to the MBMS-GW.

In this example embodiment as well, similarly to the second example embodiment, if a device cannot receive a group message, a BM-SC in a VPLMN (Visited Public Land Mobile Network) redistributes the group message request at the time of occurrence of an error. Therefore, it is possible to cope with a failure while avoiding network congestion or overload by reducing signaling.

Other Example Embodiments

Note that in this example embodiment, in group messaging between the BM-SC and the MBMS-GW, in the standard operation sequence shown in FIG. 3E, even if an error occurs due to a device state during session start processing, no message for error notification is provided, and thus the MBMS session start failure message is newly defined. However, it is also possible to delay the MBMS session start response (RAA) so as to transmit the error indication message.

While the invention has been particularly shown and described with reference to example embodiments thereof, the invention is not limited to these example embodiments. It will be understood by those of ordinary skill in the art that various changes in form and details may be made therein without departing from the spirit and scope of the present invention as defined by the claims.

The present invention is applicable to a system including a plurality of devices or a single apparatus. The present invention is also applicable even when an information processing program for implementing the functions of example embodiments is supplied to the system or apparatus directly or from a remote site. Hence, the present invention also incorporates the program installed in a computer to implement the functions of the present invention by the computer, a medium storing the program, and a WWW (World Wide Web) server that causes a user to download the program. Especially, the present invention incorporates at least a non-transitory computer readable medium storing a program that causes a computer to execute processing steps included in the above-described example embodiments.

The invention claimed is:

1. A communication processing system forming a VPLMN (Visited Public Land Mobile Network), comprising:
    a group messaging request acquirer configured to acquire, from an application in a HPLMN (Home Public Land Mobile Network), a group messaging request to be distributed to a plurality of devices;
    a group messaging request distributer configured to distribute the group messaging request to the plurality of devices;
    an error information generator configured to generate, if no response to the group messaging request is received from at least any one device in the plurality of devices within a predetermined time, error information including at least one identifier of at least one service area in which the at least an one device is included; and
    a redistribution instructor configured to instruct said group messaging request distributer to redistribute the group messaging request to the at least one service area identified by the at least one identifier.

2. The communication processing system according to claim 1, wherein said error information generator is included in a MCE (Multi-cell/multicast Coordination Entity) defined by 3GPP (Third Generation Partnership Project) group message processing, and is configured to generate, if a time from a session start to first data delivery exceeds a predetermined time in a service area, an error indication message or a session start failure message with the error information including the at least one identifier of the at least one service area.

3. The communication processing system according to claim 2, wherein said redistribution instructor is included in BM-SC (Broadcast Multimedia-Service Center) defined by 3GPP group message processing, and is configured to instruct, in response to return of the error information including the at least one identifier of the at least one service area, said group messaging request distributer to redistribute the group messaging request to the at least one service area identified by the at least one identifier.

4. The communication processing system according to claim 3, wherein said redistribution instructor is configured to instruct, if a plurality of identifiers of service areas are received, each area including at least one device from which no response has been received, said group messaging request distributer to redistribute the group messaging request in an order of time in which the plurality of identifiers have been received.

5. The communication processing system according to claim 3, wherein said redistribution instructor is configured to instruct, if a plurality of identifiers of service areas are received, each area including at least one device from which no response has been received, said group messaging request distributer to redistribute the group messaging request in descending order of priority levels included in a group message.

6. The communication processing system according to claim 2, wherein the MCE is configured to respond, to a MME (Mobility Management Entity) defined by 3GPP group message processing, with the at least one identifier of the at least one service area using a Cause region of an error indication message.

7. The communication processing system according to claim 6, wherein the MME is configured to, if the error information is received from the MCE, respond, to a MBMS-GW (Multimedia Broadcast and Multicast Service-Gateway) defined by 3GPP group message processing, with the at least one identifier of the at least one service area using a session start response message or the session start failure message.

8. The communication processing system according to claim 7, wherein the MBMS-GW is configured to, if the error information is received from the MME, respond, to a BM-SC (Broadcast Multimedia-Service Center) defined by 3GPP group message processing, with the at least one identifier of the at least one service area using the session start failure message.

9. A method of processing group messaging for a communication processing system forming VPLMN (Visited Public Land Mobile Network), the method comprising:
    acquiring, from an application in a HPLMN (Home Public Land Mobile Network), a group messaging request to be distributed to a plurality of devices;
    distributing the group messaging request to the plurality of devices;
    generating, if no response to the group messaging request is received from at least any one device in the plurality of devices within a predetermined time, error information including at least one identifier of at least one service area in which the at least any one device is included; and
    instructing to redistribute the group messaging request to the at least one service area identified by the at least one identifier.

* * * * *

UNITED STATES PATENT AND TRADEMARK OFFICE
CERTIFICATE OF CORRECTION

PATENT NO. : 10,638,360 B2
APPLICATION NO. : 15/762325
DATED : April 28, 2020
INVENTOR(S) : Toru Yamada et al.

It is certified that error appears in the above-identified patent and that said Letters Patent is hereby corrected as shown below:

In the Claims

Column 12, Line 36; In Claim 1, delete "an" and insert --any-- therefor

Signed and Sealed this
Fourteenth Day of July, 2020

Andrei Iancu
*Director of the United States Patent and Trademark Office*